United States Patent [19]
Batchelor

[11] Patent Number: 4,677,875
[45] Date of Patent: Jul. 7, 1987

[54] TRANSFER CASE FOR MULTIPLE DRIVE AXLE VEHICLE

[75] Inventor: Robert B. Batchelor, Birmingham, Mich.

[73] Assignee: American Motors Corporation, Southfield, Mich.

[21] Appl. No.: 806,696

[22] Filed: Dec. 9, 1985

[51] Int. Cl.[4] .......................... F16H 37/08; F16H 1/42
[52] U.S. Cl. ...................................... 74/695; 180/248; 180/249; 74/714
[58] Field of Search ................. 74/705, 701, 700, 695; 180/247, 248, 249, 250

[56] References Cited

U.S. PATENT DOCUMENTS

| | | | |
|---|---|---|---|
| 3,378,093 | 4/1968 | Hill | 74/714 X |
| 3,407,893 | 10/1968 | Hill et al. | 74/710.5 X |
| 3,492,890 | 2/1970 | Hill et al. | 180/249 X |
| 3,760,922 | 9/1973 | Rolt et al. | 74/710.5 X |
| 4,449,604 | 5/1984 | Suzuki | 180/248 X |
| 4,523,495 | 6/1985 | Sala | 74/695 X |
| 4,541,503 | 9/1985 | Akutagawa et al. | 180/247 X |
| 4,562,897 | 1/1986 | Renneker | 180/233 |
| 4,589,304 | 5/1986 | Ashikawa et al. | 74/714 X |

FOREIGN PATENT DOCUMENTS

| | | | |
|---|---|---|---|
| 405523 | 8/1968 | Australia | 74/695 |
| 0091406 | 10/1983 | European Pat. Off. | 74/695 |
| 0094870 | 11/1983 | European Pat. Off. | 180/248 |
| 0063525 | 4/1983 | Japan | 180/248 |
| 2074516 | 11/1981 | United Kingdom | 180/249 |

Primary Examiner—Allan D. Herrmann
Assistant Examiner—Dirk Wright
Attorney, Agent, or Firm—Brooks & Kushman

[57] ABSTRACT

The transfer case comprises differential gearing in the form of a single planetary gear set having an annulus, a first set of planet gears in engagement with the annulus, a second set of planet gears in engagement with corresponding planet gears of the first set and a sun gear in engagement with the planet gears of the second set. The input torque supplied by a transmission output member is applied to the annulus so that substantially any portion of the torque can be applied to the sun gear by appropriate sizing of the sun gear with respect to the size of the annulus. In one form of the invention, a planet carrier, upon which the planet gears are rotatably mounted, is connected to one output shaft for rotation therewith and a selectively engageable clutch permits actuation of the transfer case in a two-wheel drive mode, a full-time four-wheel drive with differential action between the front axle drive and the rear axle drive, and a four-wheel drive lock mode in which the second output shaft rotates with the first output shaft. In another form of the invention, a viscous clutch automatically drags the second output shaft for rotation with the first output shaft when the differential torque applied to one of the output shafts exceeds the traction torque load at the wheels driven by that output shaft, and thereby provides a fully automatic, full time, four-wheel drive.

18 Claims, 6 Drawing Figures

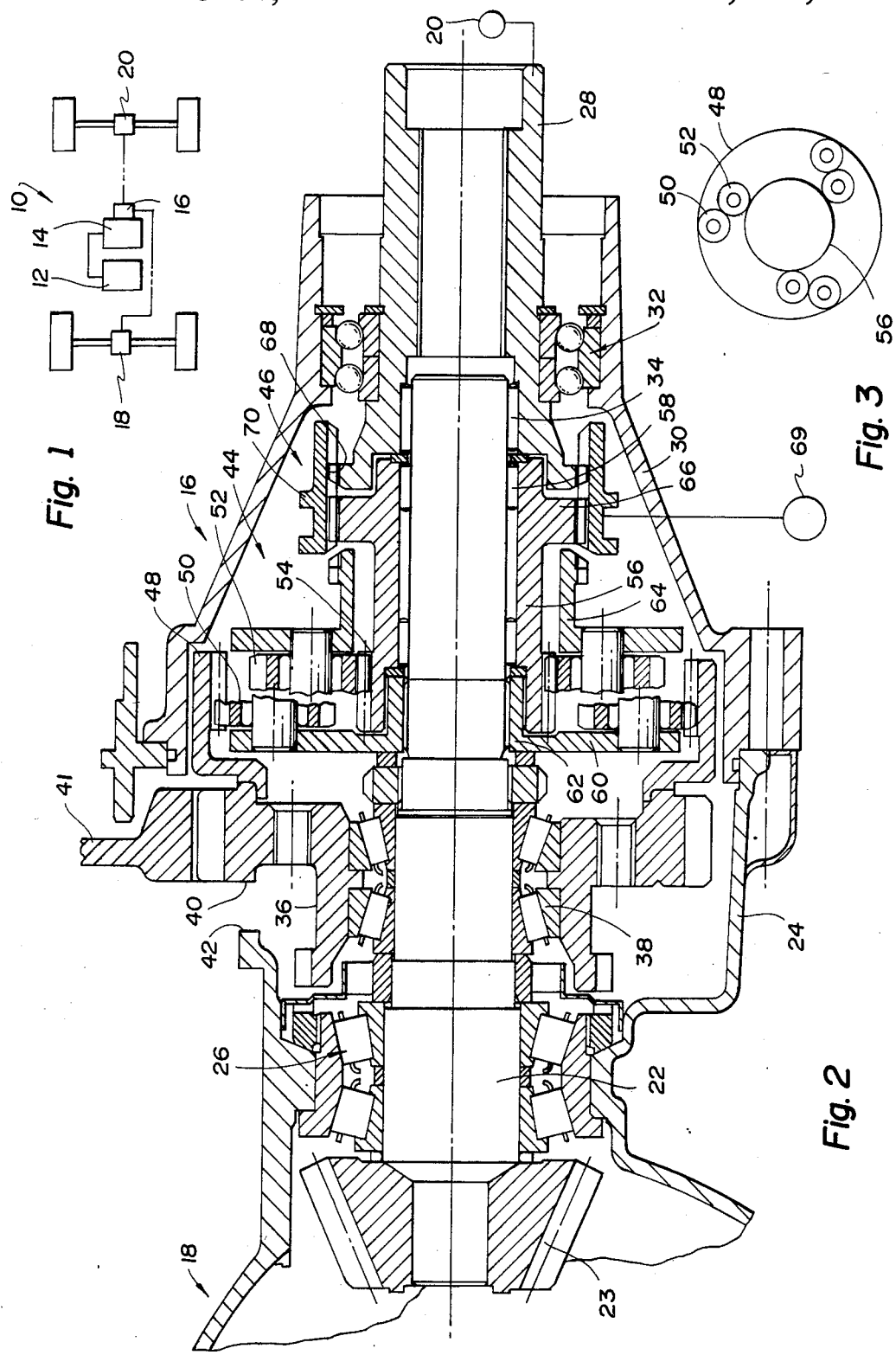

TRANSFER CASE FOR MULTIPLE DRIVE AXLE VEHICLE

BACKGROUND OF THE INVENTION

I. Field of the Present Invention

The present invention relates generally to torque transfer mechanisms having plural output paths, and, more particularly, to a torque transfer mechanism which transfers differing portions of the input torque to each output shaft.

II. Description of the Prior Art

There are many previously known motor vehicle drive trains constructed to include a transfer case so that the motive power provided by the engine and transmission combination can be applied to the wheels of more than one axle. Such transfer cases often include a selector for selectively transferring torque to one or both of the output shafts of the transfer mechanism. Although it has been known to transfer the torque equally to the output shafts when the input power is to be divided for use in driving the wheels on both front and rear axles, such a torque division does not necessarily provide optimum operating charcteristics for the vehicle. Rather, dividing torque in accordance with the weight distribution carried by each axle provides better traction and handling characteristics for the vehicle.

Moreover, it is well recognized that undesirable torque buildup within the drive train can occur when the wheels of each axle set are driven at the same speed. For example, during cornering, the wheels or the rear axle set travel a shorter arc through the corner and thus should not be driven at the same speed as the wheels of the front axle set. As a result, it has been known to apply an interaxle differential mechanism for dividing the torque irrespective of the relative speeds of the front and rear wheels. One known means for providing such interaxle differential driving of the axle sets can be provided by a planetary gear set.

For example, U.S. Pat. Nos. 3,492,890, 3,378,093, 3,407,893 and 3,760,922 disclose interaxle differential mechanisms utilizing a planetary gear arrangement. However, the input of each of these differential mechanisms comprises the planet carrier of the planetary gear set. As a result, the tooth load applied by the planet pinion engaging the annulus gear is the same as the tooth load applied by the planet pinion engaging the sun gear. Nevertheless, since the annulus is substantially larger than the sun gear, the torque split therebetween is uneven and cannot be adjusted to provide a more even torque split which may be desired.

Moreover, it has also been considered desirable to drive the front steering wheels of a vehicle when the vehicle is operated in a two-wheel mode. Since the engine and transmission take up a substantial amount of space, it is important that a transfer case be as compact as possible in order to fit amid the drive train and chassis components of the vehicle. Thus, many previously known transfer cases are not well-adapted for use in vehicles having front steering and front wheel drive configurations. In addition, while it has been known to provide previously known transfer cases with clutch means for selecting between full-time four-wheel drive (interaxle differential drive) and locked fourwheel drive where both output shafts are locked for rotation at the same speed, the previously known clutches substantially increase the size, complexity and weight of the transfer case.

SUMMARY OF THE PRESENT INVENTION

The present invention overcomes the above-mentioned disadvantages by providing a transfer case having a differential drive mechanism in the form of a planetary gear set whose annulus is part of the torque transfer input of the transfer case. In one form of the invention, the transfer mechanism includes clutch means for selecting two-wheel drive, full-time four-wheel drive which provides differential actuation of first and second output shafts, and four-wheel drive lock in which both output shafts rotate at the same speed.

In the preferred embodiment, the output shafts are axially aligned so that the planet carrier and the sun gear can be engaged with the first and second output shafts by means of a spline connection, clutch means or the like in a compact arrangement. Furthermore, the transfer mechanism is integrated with an axle drive mechanism for the wheel set on the front axle to simplify support for the output shafts and minimize the size of the drive train package. Although it is to be understood that the input for the transfer case can be provided by many known types of transmissions, the preferred embodiment preferably utilizes an automatic transmission to minimize the size and primarily, the length, of the drive drain package.

In one form of the preferred embodiment of the present invention, the planet carrier of the planetary gear set includes a spline connection with the front output shaft while the sun gear is rotatably mounted about the shaft and selectively engageable with the second output shaft through a clutch means. In another form of the preferred embodiment of the present invention, the sun gear of the planetary gear set includes a splined connection with the first output shaft and is coupled to one section of a viscous clutch while the planet carrier is coupled to the second output shaft by the second section of the viscous clutch. Thus, the present invention provides manual selection of two-wheel drive, full-time four-wheel drive or four-wheel drive lock as well as fully automatic full-time four-wheel drive. In either event, the planetary gear set preferably includes two sets of planet gears so that the direction of rotation of the sun gear corresponds with the direction of rotation of the input annulus.

BRIEF DESCRIPTION OF THE DRAWINGS

The present invention will be more clearly understood by reference to the following detailed description of a preferred embodiment of the present invention when read in conjunction with the accompanying drawing in which like reference characters refer to like parts throughout the views and in which;

FIG. 1 is a diagrammatic view of a vehicle drive train incorporating a transfer case according to the present invention;

FIG. 2 is a sectional view of a transfer case according to the present invention;

FIG. 3 is a diagrammatic view of a planetary gear set used in the transfer case shown in FIG. 1;

DETAILED DESCRIPTION OF A PREFERRED EMBODIMENT

Figure 4:
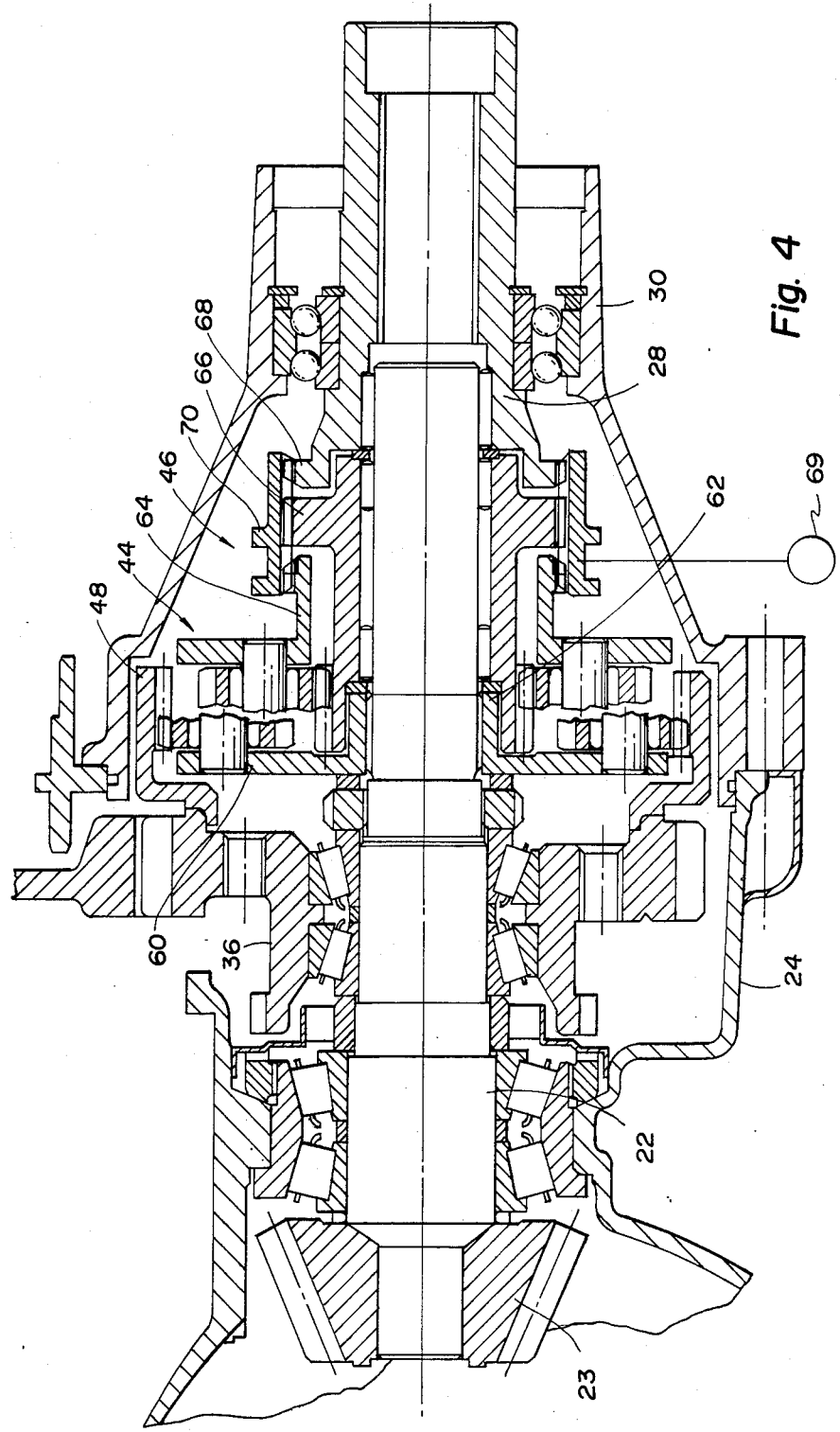
FIG. 4 is a sectional view substantially the same as FIG. 2 but showing the transfer mechanism in a further operative position.

Referring first to FIG. 1, a vehicle drive train 10 for driving the wheels of a motor vehicle comprises an engine 12 coupled through a transmission 14 to a transfer case 16. The transfer case 16 generates two outputs from the single output of the transmission 14, which is preferably an automatic transmission. One output from the transfer case 16 is coupled to the front axle drive mechanism 18 and the other output is coupled to the rear axle drive means 20. Preferably, each of the drive means 18 and 20 includes an interwheel differential mechanism for applying torque to the left and right wheels of the axle set as required.

Referring now to FIG. 2, a compact arrangement of the transfer case 16 and front drive means 18 includes an output shaft 22 rotatably mounted within a housing portion 24 by bearings 26 or the like. One end of the shaft 22 is adapted to receive a bevel pinion drive gear 23 so that the drive gear 23 is positioned for engagement with the differential mechanism of the front axle drive mechanism 18. A second output shaft 28, axially aligned with the output shaft 22, is rotatably supported in a housing portion 30 by means of bearings 32 or the like. A portion of the other end of the output shaft 22 is rotatably received within one end portion of the shaft 28 by needle bearings 34 or the like in order to optimize support of the rotatable shafts without unduly increasing the size and weight of the transfer case due to additional bearing support.

The torque input to the transfer case 16 comprises a sleeve gear 36 rotatably mounted about the shaft 22 by a bearing 38 in the housing portion 24. A toothed portion 40 of the sleeve gear 36 is exposed through an apeture means in the form of an opening 42 in the housing portion 24 so that it is accessible for engagement with an output member 41 of the transmission 14 (FIG. 1). In the preferred embodiment, the output member 41 comprises a drive gear rotatably driven by an automatic transmission. The power paths between the input sleeve gear 36 and the output shafts 22 and 28 comprise a differential means 44 in the form of a single planetary gear set and a clutch means 46.

The planetary gear set comprises an annulus 48 secured for rotation with the sleeve gear 36. The annulus includes gear teeth for engaging the teeth of a first set of first planet gears 50. A second set of second planet gears 52 engage a first gear toothed portion 54 of a sun gear 56 rotatably mounted about the output shaft 22 by needle bearings 58 or the like. As best shown in FIG. 3, each planet gear 50 of the first set engages a corresponding planet gear 52 of the second set, whereby the direction of rotation of the sun gear 56 corresponds with the direction of rotation of the annulus 48.

Referring again to FIG. 2, the planet gears 50 and the planet gears 52 are rotatably supported by a planet carrier 60. An axially extending portion 62 on one side of the planet carrier 60 is connected by splines or the like for rotation with the output shaft 22. The other side of the planet carrier 60 includes an axially extended portion 64 forming a portion of the clutch means 46.

The axially extended portion 64 of the planet carrier 60 includes teeth axially aligned with a second toothed portion 66 of the sun gear 56. In addition, the output shaft 28 includes a radially extending toothed portion 68 axially aligned with and adjacent to the toothed portion 66 of the sun gear 56. An annular clutch collar 70 is slideable along and selectively engageable with the toothed portions 64, 66 and 68 by means of a selector mechanism (not shown) for axially shifting the collar as diagrammatically shown at 69.

In the above-discussed construction, input torque delivered to the annulus 48 can be split between the output shaft 22 through the planet carrier 60, and the output shaft 28 through the sun gear 56. Unlike previously known planetary gear set differentials wherein the input is applied to the planet carrier, the sun gear 56 can be appropriately sized so that the tooth load at the sun gear portion 54 applies half the torque to the sun gear while the other half is applied to the front output shaft 22 via the planet carrier 60. Nevertheless, it will be understood that the ratio of torques applied to the front output shaft 22 and the rear output shaft 28 can be adjusted as desired, for example, to compensate for unequal load distribution on the front and rear axles.

In any event, with the clutch collar 70 in the position shown in FIG. 1, the torque by which the sun gear 56 is driven is also applied to the output shaft 28. At the same time, the planet carrier 60 is directly coupled to the output shaft 22. The planetary gear set 44 thus provides a differential between the torques applied to the front axle drive 18 and the rear axle drive 20.

Referring now to FIG. 4, the clutch collar 70 is shown engaged with the axially extending portion 64 of the planet carrier 60 as well as the sun gear 56 and the rear output shaft 28. With the planet carrier 60 thus locked in position with respect to the sun gear 56, both the output shaft 28 and the output shaft 22 are rotated at the same speed in the direction in which the annulus 48 is driven by the input sleeve gear 36. Consequently, the transfer case operates in a four-wheel drive lock mode such that the front axle drive 18 and the rear axle drive 20 are constrained to operate at the same speed.

Figure 5:
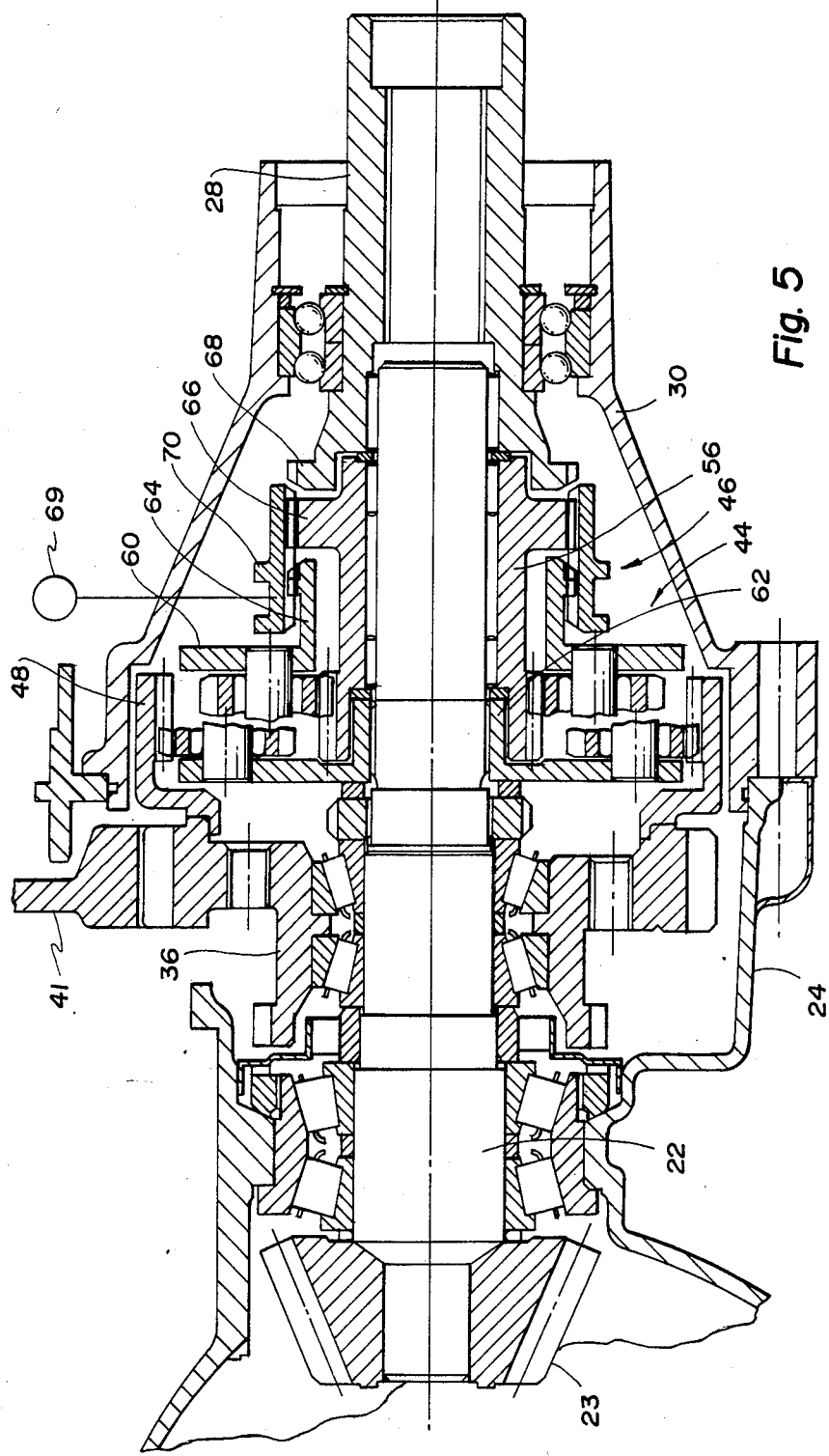
FIG. 5 is a sectional view substantially similar to FIGS. 2 and 4 but showing the transfer mechanism in a further operative position.

Referring now to FIG. 5, the clutch collar 70 has been further shifted to engage only the axial portion 64 of the planet carrier 60 and the toothed portion 66 of the sun gear 56. As a result, the drive path for the input torque is provided only through the planet carrier 60 to the output shaft 22. Thus, the transfer case 16 is operable in a two-wheel drive mode.

Figure 6:
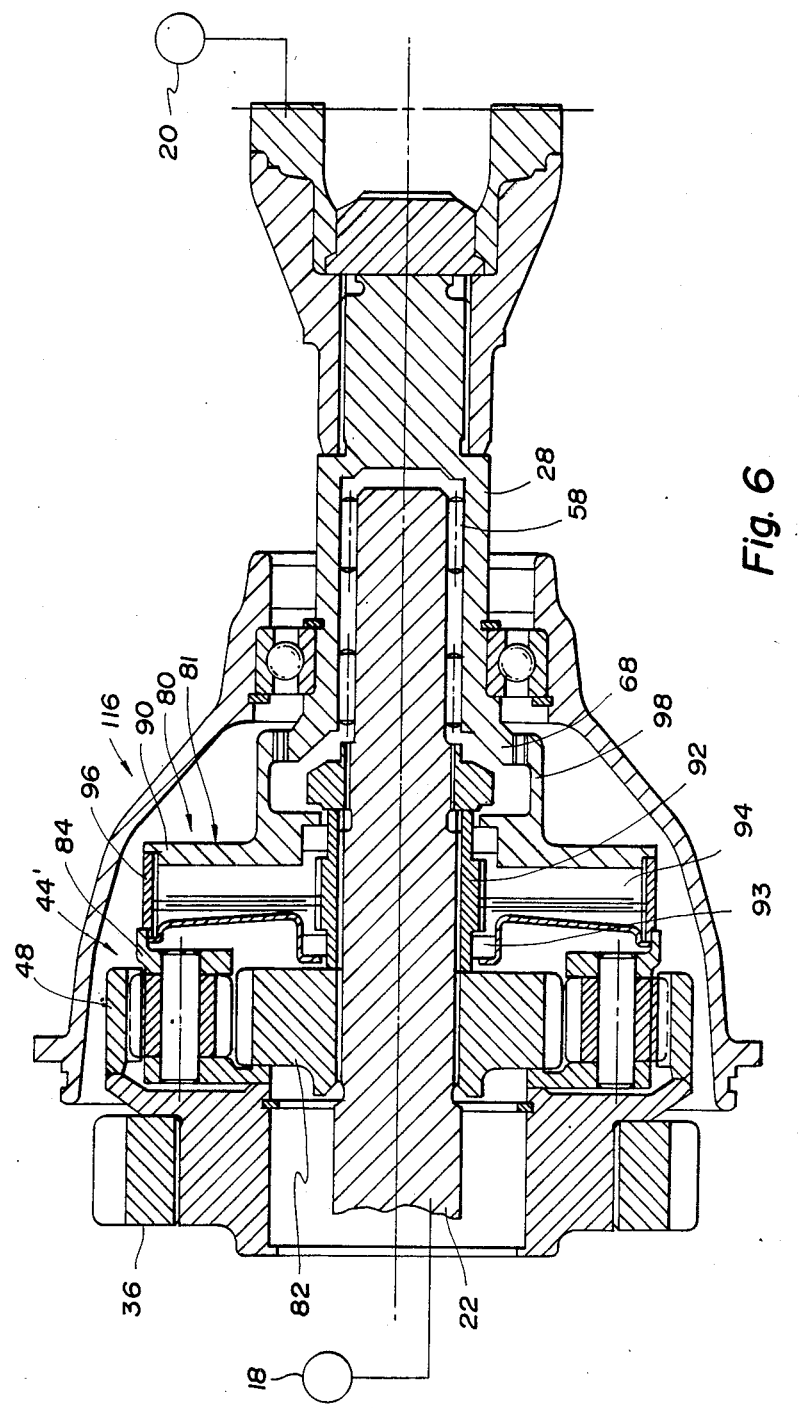
FIG. 6 is a sectional view of the transfer case showing a modification of the transfer mechanism.

Referring now to FIG. 6, a transfer case 116 according to the present invention comprises a single planetary gear set 44' and an automatic clutch means 80. The planetary gear set 44' includes an annulus 48 coupled with an input gear member 36. A set of inner gear teeth on the annulus engage a first set of planet gears 50. A second set of planet gears (not shown) substantially similar to the planet gears 52 shown in FIGS. 1 through 5 engage the gear teeth of the planet gears 50 and the gear teeth of a sun gear 82. The sun gear is engaged for rotation with the output shaft 22 by splines or the like. The first and second set of planet gears are rotatably supported by a planet carrier 84.

The automatic clutch means 80 comprises a viscous clutch 81 having an outer housing portion 90 and an inner housing portion 92 forming a fluid chamber 94 therebetween. A plurality of clutch plates are secured to a first axial portion 96 of the outer housing 90 so as to extend between similar clutch plates secured to the inner housing portion 92 in a well-known manner. In addition, the outer housing portion 90 is rotatably secured to the inner housing portion 92 by means of a fluid seal 93 in a well-known manner. Of course, the clutch plates can be perforated or provided with face configurations in a well-known manner so that when the chamber 94 is filled with viscous fluid, a predetermined relative rotation of the outer housing portion 90 with respect to the inner housing portion 92 causes interconnection of the clutch plates and limits relative rotation of the outer housing portion 90 with respect to the inner housing portion 92.

The outer housing portion 90 is coupled to the planet carrier 84 for rotation therewith. A second axially extending portion 98 of the outer housing portion 90 includes gear teeth engaged with the gear toothed portion 68 of the output shaft 28. The inner housing portion 92 is coupled to the output shaft 22 for rotation therewith, and can be conveniently mounted by extensions of the splines used to connect the sun gear 82 to the output shaft 22.

Thus, the planet carrier 84 provides a torque path through the outer housing portion 90 of the viscous clutch 81 to the output shaft 28 while the sun gear 82 provides a torque path through the output shaft 22. Thus, while the planetary gear set 44' can provide a desired torque split between the front axle drive 18 and the rear axle drive 20, the viscous clutch 80 automatically modifies the torque division when the torque being applied to an axle drive exceeds the required torque for operating the axle under the existing traction conditions. In particular, viscous interlocking of the outer housing portion 90 with respect to the inner housing portion 92 effectively drags the planet carrier 84 with respect to the sun gear 82 and thus transfers torque from one shaft to the other so that they are driven at nearly the same speed until the traction torque load returns. Thus, the transfer case 116 provides a fully automatic, full-time four-wheel drive operating mode.

Like the embodiments shown in FIGS. 1 through 5, the application of input torque to the annulus permits the torque to be evenly distributed between the front output shaft 22 and the rear output shaft 28 upon proper sizing of the sun gear with respect to the annulus. Both forms of the preferred embodiment of the present invention provide substantially shorter power paths than previously known transfer cases and thus are especially well adapted for use in vehicles having steerable driven wheels closely packaged with respect to the engine and transmission components of the vehicle drive train. In addition, the present invention provides a substantially more compact drive train than previous four wheel drive trains, particularly since the combination of an automatic transmission with the transfer case substantially reduces the axial length of the drive train and the integration of the transfer case with the front axle drive optimizes the use of available space.

Having thus described the present invention, many modifications thereto will become apparent to those skilled in the art to which it pertains without departing from the scope and spirit of the present invention as defined in the appended claims. For example, it is readily evident that the carrier of the planetary gear set could be used to drive the shaft coupled to the rear axle while the sun gear is used to drive the shaft coupled with the front axle.

What is claimed is:

1. A transfer case for a vehicle drive train having a transmission comprising:
   a housing;
   input means for receiving the torque output from the vehicle transmission;
   a first output shaft and first means for rotatably supporting said first output shaft in said housing;
   a second output shaft and second means for rotatably supporting said second output shaft in said housing; and
   means for selectively driving said first and second output shafts in response to actuation of said input means, said means for selectively driving comprising a planetary gear set having an annulus, a first set of first planet gears engaged with said annulus, a second set of second planet gears, each second planet gear being engaged with one of said first planet gears, a sun gear engaged with said second planet gears, third means for rotatably mounting said sun gear in said housing and a planet carrier having means for rotatably supporting said first and second planet gears and co-axially secured to said first output shaft for rotation therewith, and further comprising clutch means for selectively engaging said sun gear with said planet carrier and said second output shaft,
   wherein said input means comprises means for rotatably driving said annulus.

2. The invention as described in claim 1 wherein said first and second output shafts are axially aligned, and wherein said clutch means comprises a clutch collar and means for co-axially displacing said clutch collar along the axis of said output shafts.

3. The invention as defined in claim 1 wherein said vehicle transmission is an automatic transmission.

4. A transfer case for coupling the output of a vehicle transmission whose axis is longitudinally aligned with the vehicle to at least two axle drive mechanisms comprising:
   a housing;
   an input means for receiving the torque output from the vehicle transmission;
   a first output shaft and first means for rotatably supporting said first output shaft in said housing;
   a second output shaft and second means for rotatably supporting said second output shaft in said housing;
   means for selectively driving said first and second output shafts in response to activation of said input means, said means for selectively driving comprising differential means for driving said first output shaft at a first variable rotary speed in response to actuation of said input means and driving said second output shaft at a second variable rotary speed in response to activation of said input means, and further comprising clutch means for selectively engaging said second output shaft for rotation with said first output shaft;
   wherein said differential means comprises a planetary gear set having an outer annulus and wherein said input means includes said annulus;
   wherein said first and second output shafts are axially aligned and parallel to said transmission axis.

5. The invention as described in claim 4 wherein said planetary gear set comprises an annulus, a first set of first planetary gears engaged with said annulus, a second set of second planet gears, each second planet gear being engaged with a corresponding one of said first planet gears, a sun gear engaged with said second set of second planet gears, means for rotatably supporting said sun gear about the axis of said first output shaft, and a planet carrier, having means for rotatably supporting said first and second planet gears, co-axially secured to said first output shaft for rotation therewith.

6. The invention as described in claim 5 wherein said clutch means comprises a clutch collar and means for coaxially displacing said clutch collar along the axis of said output shafts.

7. A transfer case for coupling the output of a vehicle transmission to at least two axle drive mechanisms comprising:
a housing;
an input means for receiving the torque output from the vehicle transmission;
a first output shaft and first means for rotatably supporting said first output shaft in said housing;
a second output shaft and second means for rotatably supporting said second output in said housing; and
means for selectively driving said first and second output shafts in response to activation of said input means, said means for selectively driving comprising differential means for driving said first output shaft at a first variable rotary speed in response to actuation of said input means and driving said second output shaft at a second variable rotary speed in response to activation of said input means, and further comprising clutch means for selectively engaging said second output shaft for rotation with said first output shaft;
wherein said differential means comprises a planetary gear set having an outer annulus and wherein said input means includes said annulus; and
wherein said clutch means comprises automatic clutch means for automatically engaging said second output shaft with said first output shaft for rotation therewith when the difference between said first rotary speed and said second rotary speed exceeds a predetermined value.

8. The invention as described in claim 7 wherein said automatic clutch means comprises a viscous clutch.

9. The invention as described in claim 8 wherein said planetary gear set includes a first set of first planet gears, each said first planet gears engaged with said annulus, a second set of second planet gears corresponding in number to said first planet gears and engaged with a corresponding first planet gear, a sun gear engaged with said second planet gears, means for coaxially mounting said sun gear to said first output shaft for rotation therewith, a planet carrier and means for rotatably mounting said first and second planet gears to said planet carrier.

10. The invention as described in claim 9 wherein said viscous clutch comprises an outer housing, an inner housing, means for concentrically rotatably supporting said outer housing on said inner housing and means for viscously coupling said outer housing for rotation with said inner housing,
and further comprising means for coupling said outer housing to said planet carrier for rotation therewith, means for coupling said inner housing to said first output shaft for rotation therewith, and means for coupling said outer housing to said second output shaft for rotation therewith.

11. The invention as described in claim 10 wherein said first and second output shafts are axially aligned.

12. The invention as described in claim 7 and wherein said transmission is an automatic transmission.

13. A transfer case for coupling the output of a vehicle transmission to at least two axle drive mechanisms comprising:
a housing;
an input means for receiving the torque output from the vehicle transmission;
a first output shaft and first means for rotatably supporting said first output shaft in said housing;
a second output shaft and second means for rotatably supporting said second output shaft in said housing; and
means for selectively driving said first and second output shafts in response to activation of said input means, said means for selectively driving comprising differential means for driving said first output shaft at a first variable rotary speed in response to actuation of said input means and driving said second output shaft at a second variable rotary speed in response to activation of said input means, and further comprising clutch means for selectively engaging said second output shaft for rotation with said first output shaft;
wherein said differential means comprises a planetary gear set having an outer annulus and wherein said input means includes said annulus;
wherein said planetary gear set comprises an annulus, a first set of first planetary gears engaged with said annulus, a second set of second planet gears, each second planet gear being engaged with a corresponding one of said first planet gears, a sun gear engaged with said second set of second planet gears, means for rotatably supporting said sun gear about the axis of said first output shaft, and a planet carrier, having means for rotatably supporting said first and second planet gears, co-axially secured to said first output shaft for rotation therewith;
wherein said clutch means comprises means for selectively engaging said sun gear with said second output shaft; and
wherein said clutch means further comprises means for selectively engaging said sun gear with said planet carrier.

14. The invention as defined in claim 13 wherein said first and second output shafts are axially aligned and said clutch means comprises a clutch collar and means for coaxially displacing said clutch collar along the axis of said output shafts.

15. A transfer case for coupling the output of a vehicle transmission to at least two axle drive mechanisms comprising:
a housing;
an input means for receiving the torque output from the vehicle transmission;
a first output shaft and first means for rotatably supporting said first output shaft in said housing;
a second output shaft and second means for rotatably supporting said second output shaft in said housing; and
means for selectively driving said first and second output shafts in response to activation of said input means, said means for selectively driving comprising differential means for driving said first output shaft at a first variable rotary speed in response to actuation of said input means and driving said second output shaft at a second variable rotary speed in response to activation of said input means, and further comprising clutch means for selectively engaging said second output shaft for rotation with said first output shaft;
wherein said differential means comprises a planetary gear set having an outer annulus and wherein said input means includes said annulus;

wherein said transfer case further comprises means for coupling one of said first and second output shafts to said one of said axle drive mechanisms; and wherein said coupling means comprises a bevel gear secured at one end of said one shaft.

16. The invention as defined in claim 15 wherein said vehicle transmission is an automatic transmission.

17. A transfer case for coupling the output of a vehicle transmission to at least two axle drive mechanisms comprising:
   a housing;
   an input means for receiving the torque output from the vehicle transmission;
   a first output shaft and first means for rotatably supporting said first output shaft in said housing;
   a second output shaft and second means for rotatably supporting said second output shaft in said housing;
   means for selectively driving said first and second output shafts in response to activation of said input means, said means for selectively driving comprising differential means for driving said first output shaft at a first variable rotary speed in response to actuation of said input means and driving said second output shaft at a second variable rotary speed in response to activation of said input means, and further comprising clutch means for selectively engaging said second output shaft for rotation with said first output shaft;
   wherein said differential means comprises a planetary gear set having an outer annulus and wherein said input means includes said annulus; and
   wherein said housing comprises a first housing part having an aperture means for exposing said input means, and wherein said input means comprises a sleeve gear engaged with said annulus, and means for rotatably supporting said sleeve gear in registration with said aperture means.

18. The invention as defined in claim 17 wherein said vehicle transmission is an automatic transmission.

* * * * *

UNITED STATES PATENT AND TRADEMARK OFFICE
CERTIFICATE OF CORRECTION

PATENT NO. : 4,677,875
DATED : July 7, 1987
INVENTOR(S) : Robert B. Batchelor

It is certified that error appears in the above-identified patent and that said Letters Patent is hereby corrected as shown below:

Column 1, Line 56,  After "two-wheel" insert --drive--;

Column 2, Line 28,  "drain" should be --train--.

Signed and Sealed this

Twenty-sixth Day of January, 1988

Attest:

DONALD J. QUIGG

*Attesting Officer*          *Commissioner of Patents and Trademarks*